(12) United States Patent
Pilja

(10) Patent No.: US 7,004,455 B2
(45) Date of Patent: Feb. 28, 2006

(54) JOINER IMPROVEMENTS

(76) Inventor: Milan Pilja, 16 James Street, Woodville West, South Australia (AU) 5011

( * ) Notice: Subject to any disclaimer, the term of this patent is extended or adjusted under 35 U.S.C. 154(b) by 0 days.

(21) Appl. No.: 10/480,766

(22) PCT Filed: Oct. 24, 2002

(86) PCT No.: PCT/AU02/01437

§ 371 (c)(1),
(2), (4) Date: Dec. 12, 2003

(87) PCT Pub. No.: WO03/035992

PCT Pub. Date: May 1, 2003

(65) Prior Publication Data

US 2004/0169168 A1    Sep. 2, 2004

(30) Foreign Application Priority Data

Oct. 24, 2001   (AU) .................................. PR 8448

(51) Int. Cl.
*B66F 3/08*    (2006.01)
(52) U.S. Cl. ........................................................ 254/13
(58) Field of Classification Search ................. 254/13, 254/12, 103, 100; 29/239, 256, 257
See application file for complete search history.

(56) References Cited

U.S. PATENT DOCUMENTS 1,419,544 A  *  6/1922  De Benedetti .............. 254/103

FOREIGN PATENT DOCUMENTS

| DE | 298 19 955 U1 | 3/1999 |
|----|---------------|--------|
| GB | 1428565 A | 3/1976 |
| JP | 8-135029 A | 5/1996 |
| JP | 08159121 A | 6/1996 |
| JP | 2001-289501 A | 10/2001 |
| WO | WO 98/38008 A | 9/1998 |

* cited by examiner

*Primary Examiner*—Robert C. Watson
(74) *Attorney, Agent, or Firm*—Akerman Senterfitt

(57) ABSTRACT

A joining arrangement having at least one engaging member (3, 49), a screw threaded shaft (2) passing through the engaging member at least one nut (7) threadably engaging the shaft, a gear member (9), a pivot locator (14) on the engaging member such that a shaft (10) with a second gear member (12) may inter engage with the pivot locater while having the said second gear member adapted to interengage with the said first gear member whereby to facilitate a tightening of the joining arrangement.

15 Claims, 7 Drawing Sheets

Fig 5.1

JOINER IMPROVEMENTS

TECHNICAL FIELD

The present field of the invention relates to joining arrangements.

BACKGROUND OF THE INVENTION

Currently, there exists a number of joining arrangements or devices that are able to be used to securely hold two or more portions in close proximity.

There is known to be a difficulty in effecting a tightening and therefore a clamping effect between two portions, wherein there may well be limited access to the joining arrangement when located within the cavities of the portions.

One of the ways that this is achieved is by use of an open ended spanner. However, this may exasperate the operator due to the intricacies of the overall operation and instillation of the appropriate joining arrangement.

Typically such joining arrangements are utilised in the construction of benches and desks.

The problem with an open ended spanner is that a nut or hexagonal head or the like will conventionally lie against the surface within the cavity so that the amount of freedom by which engage and then turn the nut is restricted.

In practice then this means that a person might spend a considerable time tightening any threadably engaging member on the shaft.

DISCLOSURE OF THE INVENTION

In one form, the invention can be said to reside in a joiner including at least one engaging member, a screw threaded shaft passing through the engaging member or a channel through the engaging member, at least one nut threadably engaging the shaft, a gear member, a pivot locator on the engaging member such that a shaft with a second gear member may inter-engage with the pivot locator while having the said second gear member adapted to interengage with the said first gear member whereby to facilitate a tightening of the joiner by effecting a relative rotation of the nut with respect to the shaft.

In preference, the screw threaded shaft is a bolt.

In preference, the thread on the screw threaded shaft is left hand.

In preference, the pivot locator is a cavity within the engaging member.

In preference, the cavity is in the form of a cylindrical aperture which has its axis aligned transversely to the elongate axis of the shaft.

In preference, the first said gear is a gear comprised of a plastics material and having means to effect an interlocking with an end of the screw threaded shaft.

In preference and in the alternative, the first said gear is adapted to interlock with respect to the nut.

In preference, there are two engaging members such that the screw threaded shaft passes respectively either through an aperture in each respective engaging member or through one or more channels passing through the respective engaging members.

In preference, the first said gear member has its teeth aligned so that they are facing in the direction of the body of the shaft.

In preference, each of the two engaging members include on an inner face, an arcuate shape adapted to engage with a nesting fit, a similarly shaped side wall of a cavity within a bench or desk portion.

In preference, and in the alternative, there is a tightening arrangement for a bolt with at least one tightening end, at least one engaging member through which the bolt passes, the arrangement being characterised in that there is a gear means as a part of or attached to either a nut engaged by a head of the bolt such that rotation of the gear means will result in the nut effecting a tightening with respect to the bolt, and a pivot locator positioned adjacent the first said gear means and aligned to support a shaft end supporting a pinion gear whereby upon rotation of the pinion gear, this will effect a rotation of the gear means and thus effect said tightening effect.

In a further form of this invention, it can be said to reside in the method of effecting a tightening of a joiner which includes the steps of locating within cavities adjacent each side of an adjoining an abutting face, a respective engaging member which has passing therethrough a shaft which is screw threaded and whereby there is a gear means as a part of or attached to either the nut or a head of the bolt and effecting a rotation of the gear means so as to effect a tightening of the bolt by means of a shaft supporting at its end a pinion gear with a projecting finger locating within a pivot locator positioned adjacent the first said gear means and being within the respective engaging member.

In yet another embodiment of the invention, there is a joiner as substantially described above, which further includes engaging members having recesses shaped to allow a nesting fit of the second gear member to assist in the locating of the second gear member in close proximity relative to the first gear member.

In preference, the engaging members also have a recess shaped to nest a portion of the first gear member so as to allow the first gear member to rotate freely without the engaging member obstructing the gear teeth.

In preference, the engaging members have a recess shaped to ensure a nesting fit with the threadably engaging nut so as to obstruct the rotation of the nut relative to the engaging member.

In preference the first gear member is made of metal.

In preference, the engaging members are made of a composite plastic/glass material.

In preference, the joiner arrangement has support members that positively engage the screw threaded shaft such that the engaging member is held against either the first gear member or the threadably engaging nut so as to obstruct the engaging object from sliding feely along the screw threaded shaft during positioning of the joining arrangement.

In preference, the support members are clips.

In preference, the support members are constructed from plastic.

In preference, the second gear member can be positioned in the engaging member of the joining arrangement to form a stable platform so that the joining arrangement can be located within the required cavities and tightened in a single operation.

In preference the joining arrangement is used in edge-to-edge joining of particleboard type components.

In preference, the engaging members are arcuate shaped to nest within a cavity within a particle board to be joined to another

BRIEF DESCRIPTION OF THE DRAWINGS

FIG. 5.1 shows the arrangement of the head of the screw threaded shaft nested inside the first gear member of the joiner of FIG. 5.

BEST MODE FOR CARRYING OUT THE INVENTION

Figure 1:
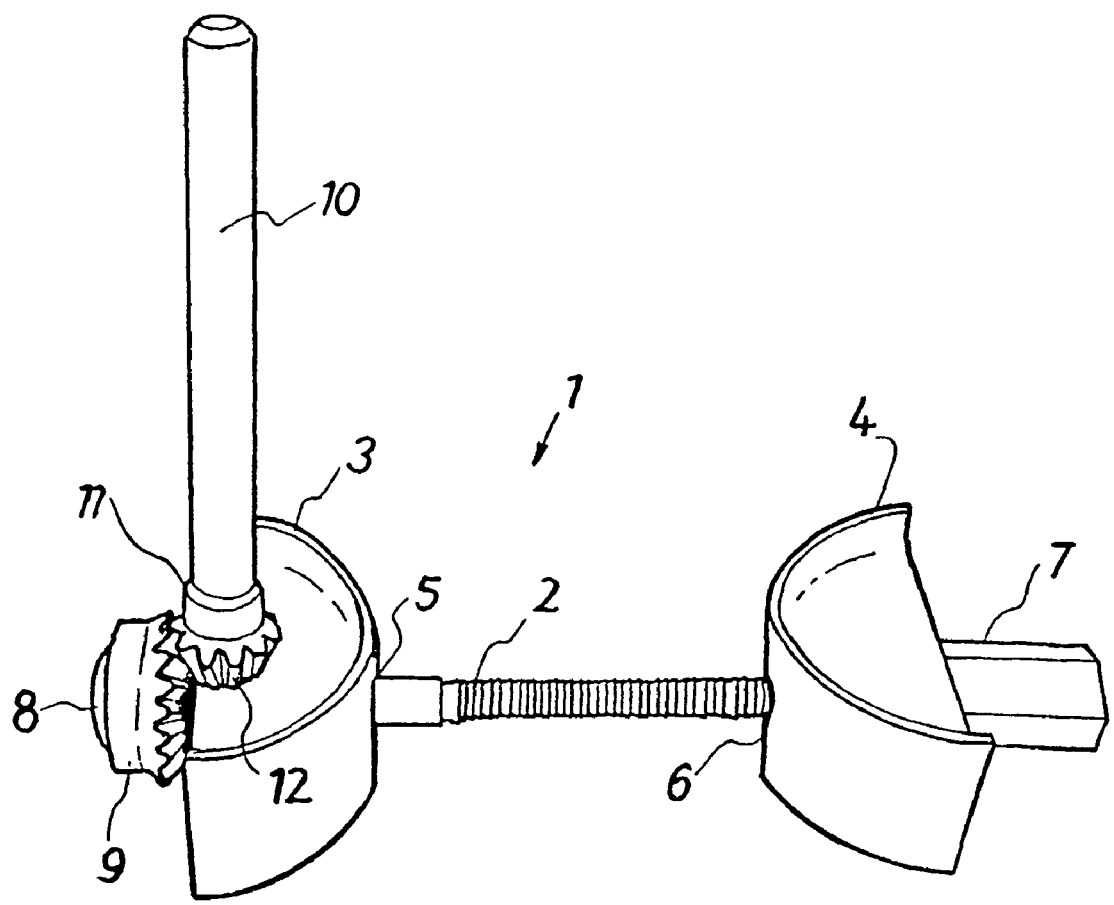
FIG. 1 is a perspective view of an assembly incorporating the invention according to the first embodiment.

Referring in detail to the drawings, there is a joining arrangement 1 which includes a screw threaded shaft 2 which in this case is a bolt, a first engaging member 3 and a second engaging member 4.

The engaging members 3 and 4 each have passing therethrough a bore which is shown at 5 and 6 by which the shaft 2 passes fully through these and is thereby engaged at one end by a nut 7 and at the other in conjunction with a head 8 a gear member 9.

There is a shaft 10 which has at its lower end 11, a pinion gear 12 and at its furthermost end a finger 13.

There is a locating aperture 14 in the engaging member 3.

This aperture 14 is in the form of a cylindrical bore and the bore has first of all an axis which is transverse to the elongate axis 15 of the shaft 2 and is also arranged so that its own axis will intersect the axis 15 of the shaft 2.

This then allows the arrangement to be such that the shaft 10 with its lowermost finger 13 to be located so that the pinion 12 will engage with a meshing fit so that rotation of the shaft 10 about its own elongate axis has maintained and guided by its relationship with the aperture 14, will ensure that the intermeshing gear 9 will also be rotated about its own axis which coincides with the axis of the shaft 2 at 15.

It will be seen then that the gear 9 is formed as a different material such as a plastics material which is then molded onto the head 8 of the shaft 2 and in the event that this is of a type known as a coach bolt, then it will ensure that rotation about the axis 15 of the gear member 9 will ensure rotation of the shaft 2.

The nut 7 will be reason of the threadable engagement with the shaft 2 thus be caused to be tightened and feed along in the appropriate direction of the shaft to effect either a tightening or a loosening effect dependent upon the rotation direction of the shaft 10 about its axis.

Figure 2:
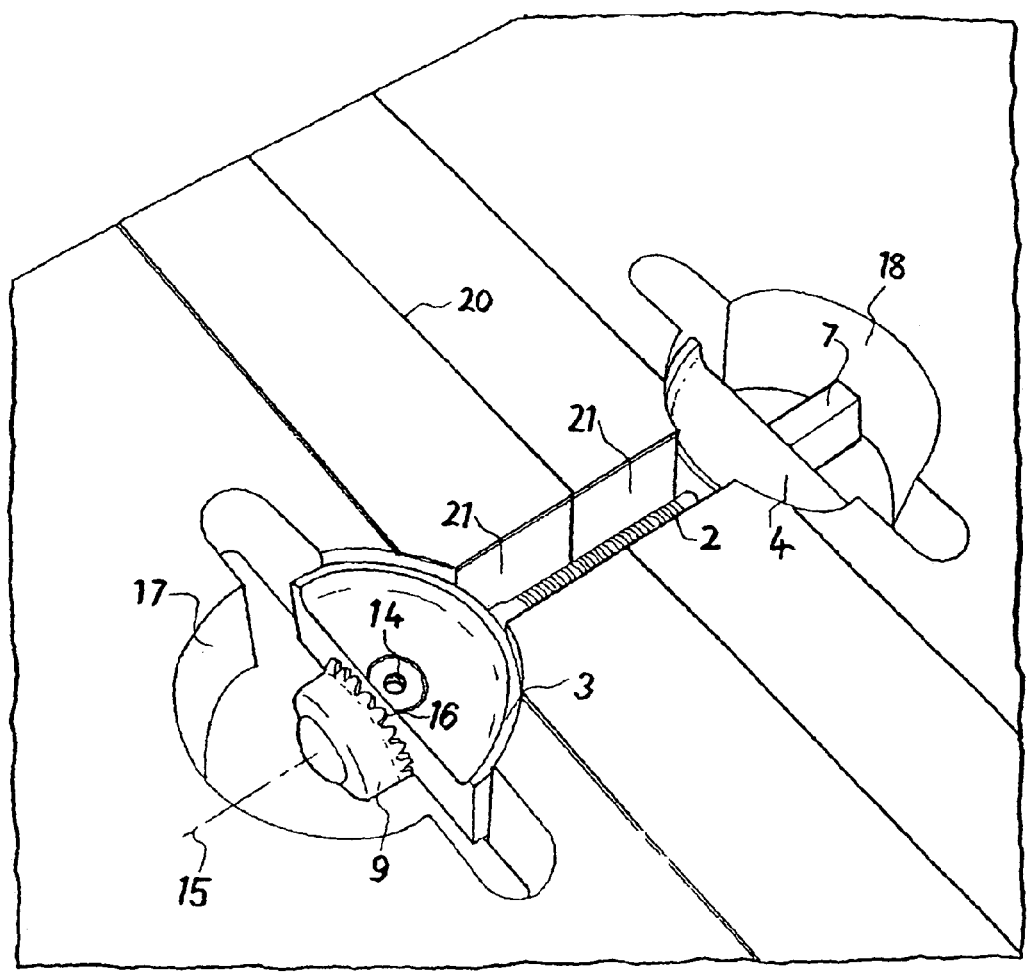
FIG. 2 is a perspective of the same assembly as in FIG. 1 with the joining arrangement being positioned within adjacent portions of a bench top and without the second gear member being in position.
Figure 3:
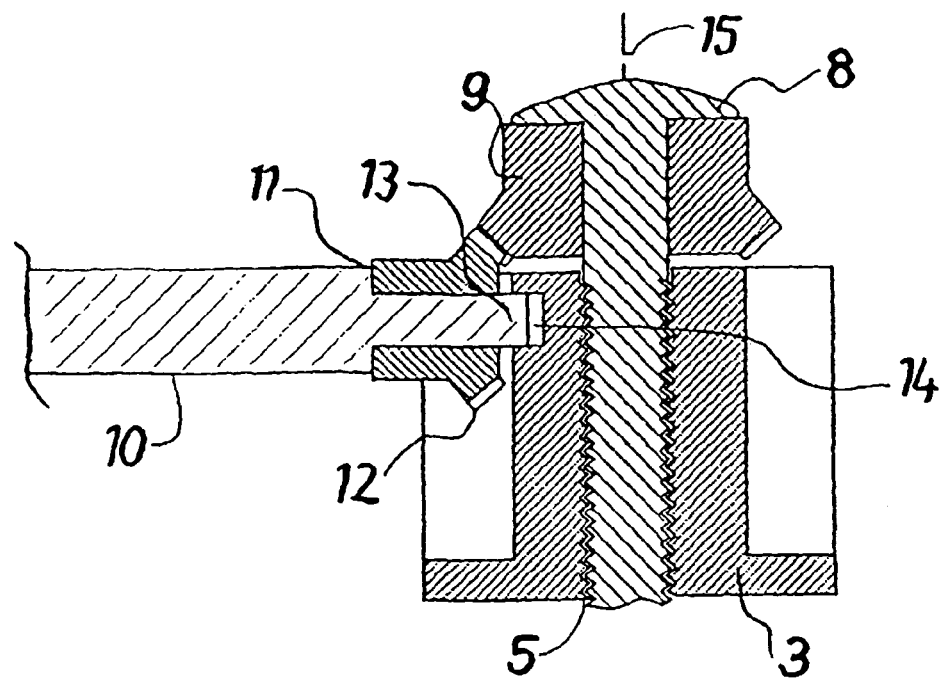
FIG. 3 is a cross sectional view of the joiner of the first embodiment as shown in FIG. 1.
Figure 3:
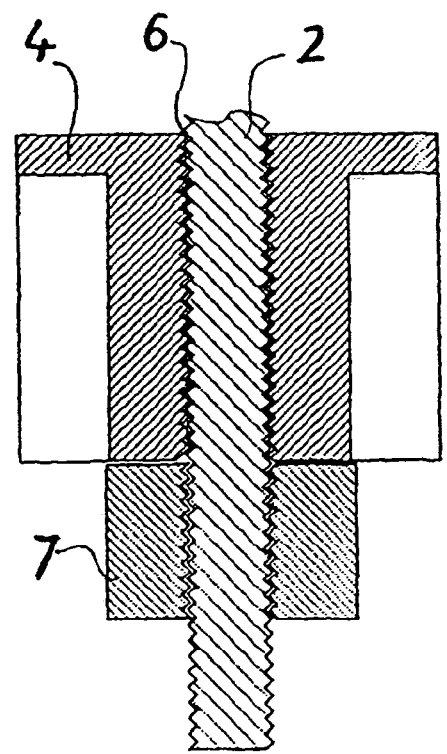
Figure 4:
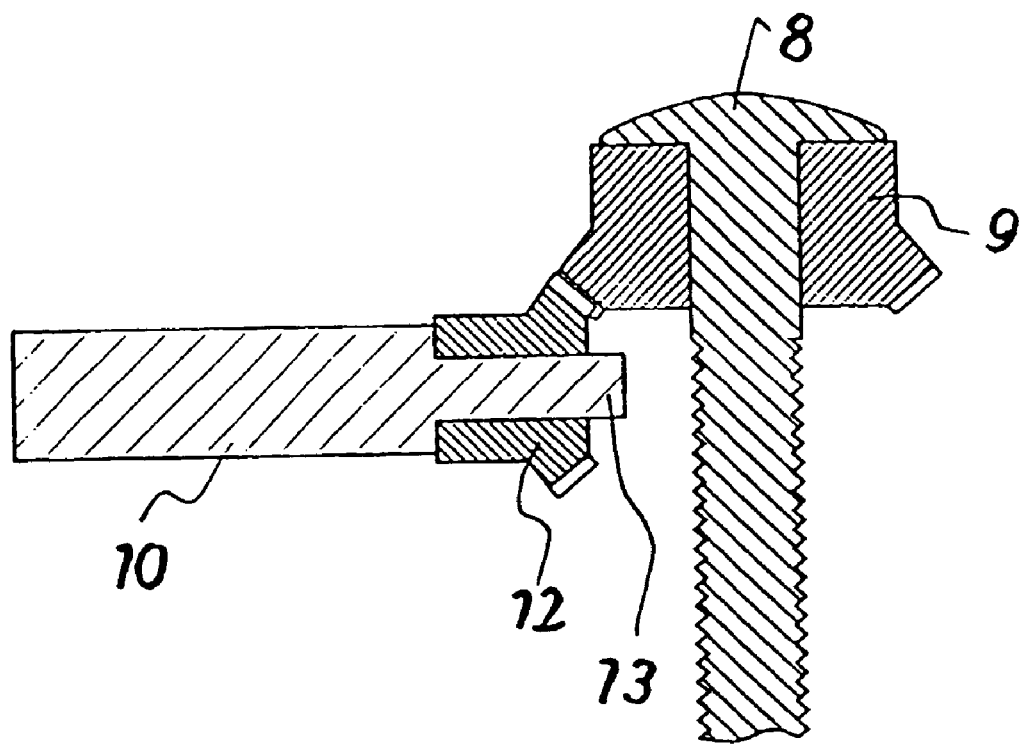
FIG. 4 is a side elevation of the respective gear parts showing how these interrelate but with the engaging member removed.
Figure 5:
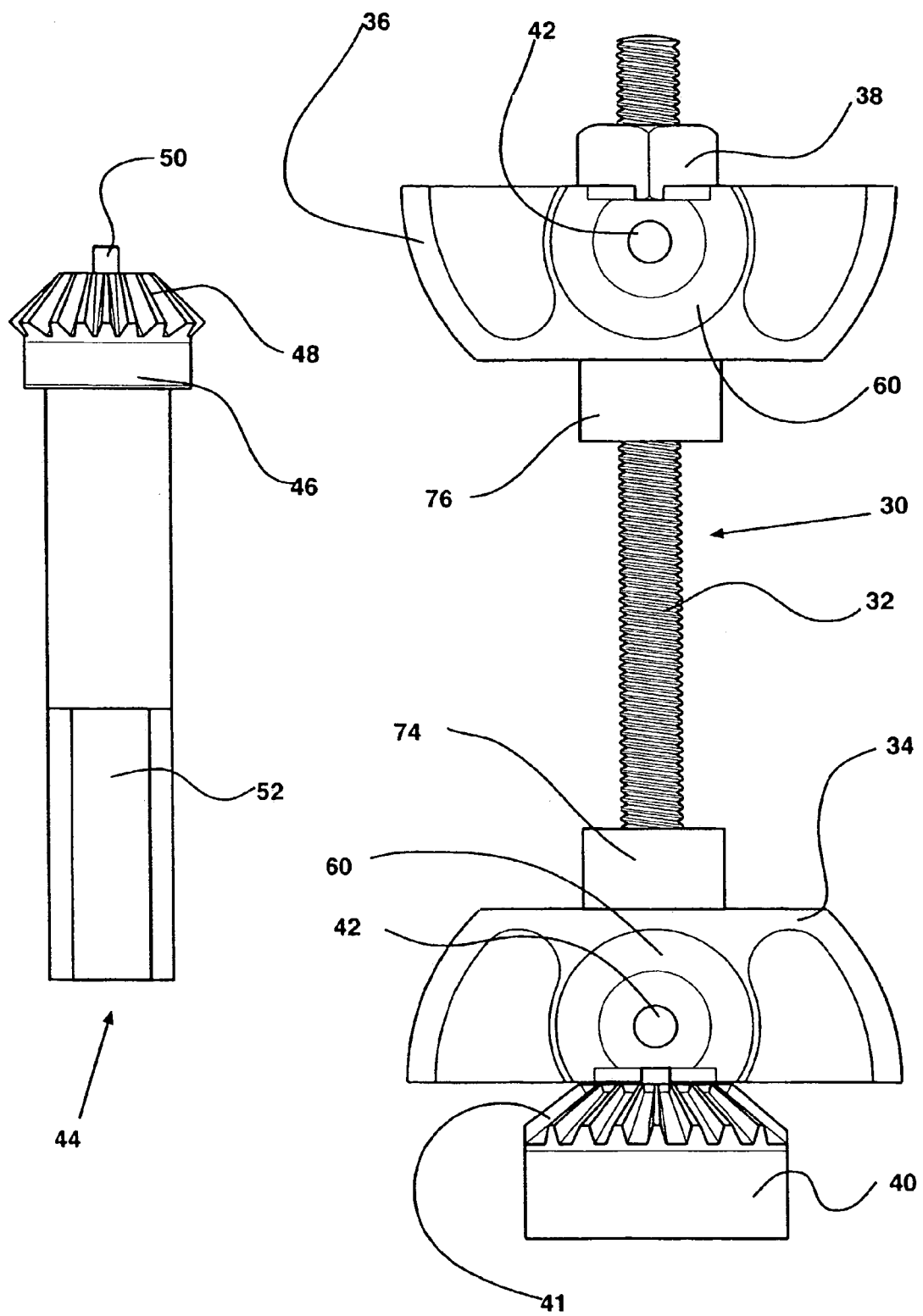
FIG. 5 shows a plan view of a further embodiment of the invention.
Figure 6:
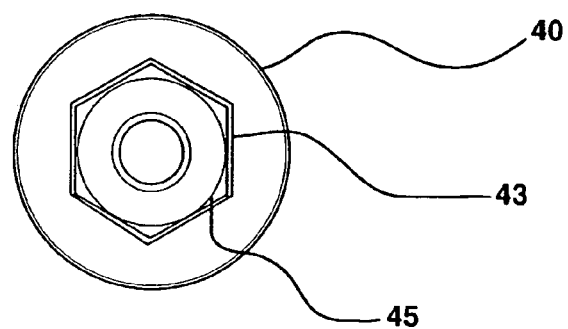
FIG. 6 is a cross sectional view of an engaging member shown in FIG. 5.
Figure 6:
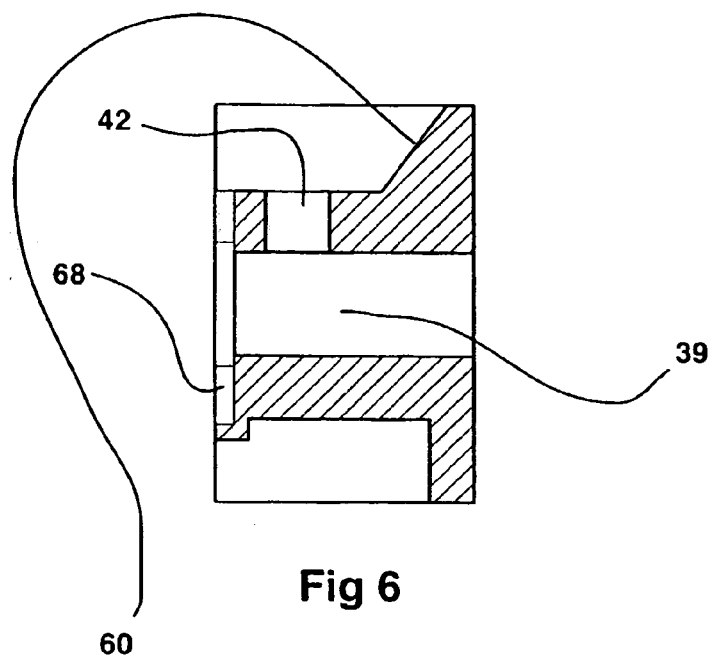
Figure 7:
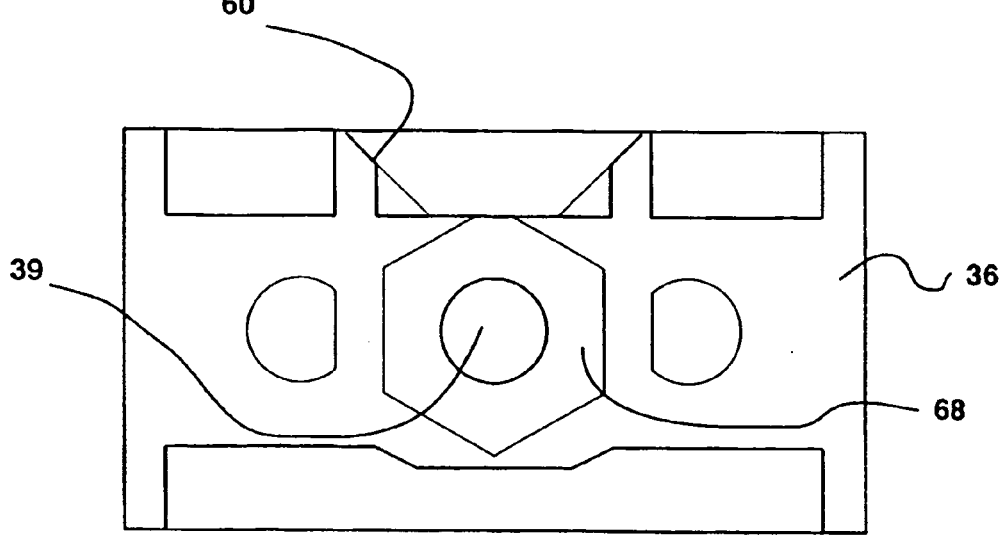
FIG. 7 is a side elevation of an engaging member as shown in FIG. 5.
Figure 8:
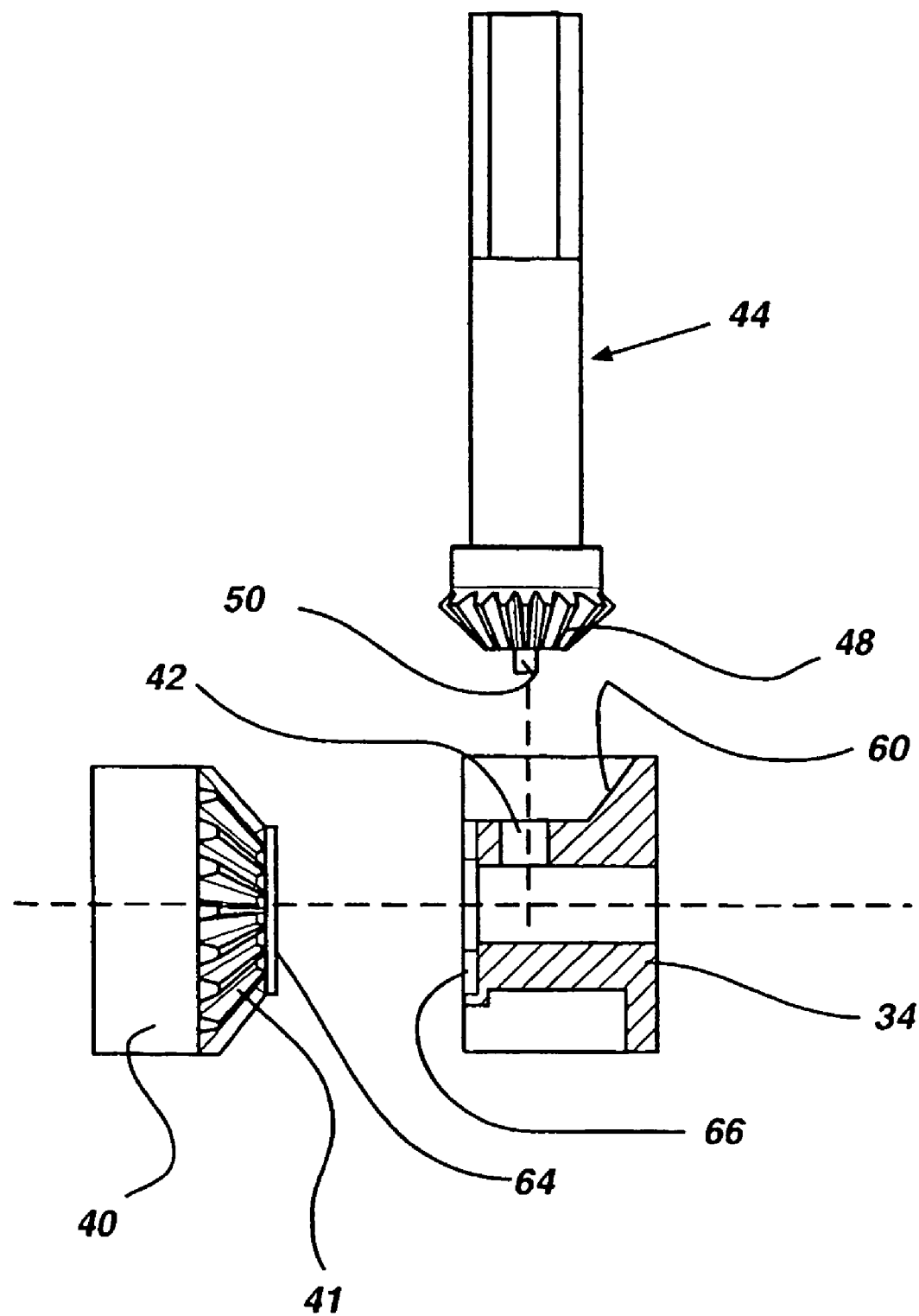
FIG. 8 shows a cross sectional view of an engaging member, as shown in FIG. 5, as well as the first and second gear members and their respective orientation.

By having the engaging members 3 and 4 positioned within cavities 17 and 18 which are shown specifically in FIG. 2 which are typically the type of cavities that are cut into the underneath side of a bench top or desk top or something similar, means that whereas hitherto access for instance by an open ended spanner to the nut 7 would be very restricted and allow for only incremental rotation of the nut, now it is possible to simply quickly engage a generally available shaft 10 with pinion 12 the bore 14 and within a couple of seconds fully tighten this arrangement.

This then ensures that the matching adjoining edges at 20 will be held most tightly and further whoever is in fact effecting the tightening, can be sure that a minimal time will be necessary to effect such tightening and thus saving money.

The use of a pivot locator being the aperture 14 within the recessed surface of the engaging member 3 provides at minimal expense a pivot locator.

Some advantages therefore achieved using this arrangement which can be identified also by reason of the direction of the teeth 16 being pointed toward a remainder of the shaft and the tightening nut.

The method of use of the arrangement then incorporates locating the assembly as shown within the cavities and including of course the channels 21 and 22 and then with the shaft 10 being held perhaps in the chaff of a drill, effecting a rapid rotation which may take only several seconds to effect a full tightening.

While the description illustrates one arrangement of the location of the nut on a shaft, it will be seen that there are a few alternatives that would also be applicable.

While the pivot locator 14 has been described as an aperture, it is also possible to provide this as a spigot and to have an aperture within the end of the shaft 10 thereby acting as a locator.

Further, the gear 9 while being shown as a separately constructed member which in this case is formed from injection molded plastics material, can be made from metals or it can be formed as an integral part of a bolt.

While it has been described as being connected to the head of a bolt, it is clear that it also could be connected directly to a nut which then by being rotated could effect a tightening of the shaft.

Referring now to FIGS. 5–8, in another embodiment of the invention, there is a joining arrangement 30 which includes a screw threaded shaft 32 which in this case is a bolt, a first engaging member, a first engaging member 34 and a second engaging member 36.

There is a shaft 44, with a lower end 46 having a second gear 48 and a projection 50. Shaft 44 has a hexagonally shaped portion 52 so as to nest within a standard drill chuck or hexagonal head adapter therefore.

The engaging members 34 and 36 each have a aperture passing there through in which the screw threaded shaft 32 passes fully through these and is thereby engaged at one end by a nut 38 and a first gear member 40, with gear teeth 41.

The engaging members 34 and 36 each have a locating aperture 42, which is in the form of a cylindrical bore and the axis of this bore is transverse to the elongate axis of the screw threaded shaft 32.

This then allows for the arrangement to be such that a the shaft 44 with its projection 50 can seat into aperture 42 with a nesting fit, such that the second gear 48 will engaging with a meshing fit to the first gear 40 so that the rotation of the shat 44 about its own elongate axis is maintained by its nesting relationship with aperture 42, will ensure that the intermeshing of gears 40 will also be rotated about its own axis which coincides with the axis of the screw threaded shaft 32. In this embodiment, the gear 40 is made from a metal or metal alloy, but may also be constructed from plastics, and has a recess 43 adapted to ensure a nesting fit with the head 45 of the screw threaded shaft 32. Therefore, as the nut 38 is threadably engaged with the screw threaded shaft 32 it will caused to be tightened and feed along in the appropriate direction of the screw threaded shaft so as to effect either a tightening or a loosening effect dependant upon the rotation direction of the shaft 44 about it s axis.

The engaging members also have a recess 60 shaped such that edge 62 matches the profile of gear 48 so to accommodate the second gear 48 of shaft 44 in a nesting arrangement and thus compliments the projection 50 nesting within aperture 42 hence facilitating the placement of the second gear member 48 relative to the first gear member 40 to help ensure effective intermeshing of 48 and 41.

This also allows the joining arrangement 1 to sit securely on the second gear member 44 to provide a stable platform so that the joining arrangement can be placed in a cavity and tightened in single motion when the second gear member 44 is fitted to a power drill or similar.

To ensure a smooth rotation of the first gear 40, the first gear 40 with teeth 41 has a projection 64 shaped to provide clear nesting rotation in the recess 66 of engaging member 34.

Engaging member 36 has recess 68 that is shaped to accept in a nesting fit the threadably engageable nut 38 so as to obstruct the free rotation of nut 38 relative to the engaging member. This then facilitates the operation of the joining arrangement 30 when it is placed in the cavities of the portions to be joined.

Another feature to facilitate the operation of the joining arrangement is the use of support members 74 and 76, which can be clips, that positively engage the screw threaded shaft 32 so as to restrain the movement of the engaging members 34 and 36 so to hold them in close relationship with gear member 40 and nut 38 respectively. This then allows the joining member to be placed in the cavities of the portions to be joined with out the need to substantially hold the engaging members in a position that allows them to be used effectively.

What is claimed is:

1. A joiner including:
   at least one engaging member,
   a screw threaded shaft passing through at least one of the engaging member and a channel through the engaging member,
   at least one nut threadably engaging the shaft,
   a first gear member, and
   a pivot locator on the engaging member such that a shaft with a second gear member may inter-engage with the pivot locator while having said second gear member adapted to inter-engage with the said first gear member to facilitate a tightening of the joiner by effecting a relative rotation of the nut with respect to the shaft,
   wherein said first gear member has its teeth aligned facing in the direction of the body of the shaft.

2. The joiner of claim 1, wherein said screw threaded shaft has a left hand thread.

3. The joiner of claim 1, wherein the pivot locator is a hole within the engaging member.

4. The joiner of claim 2, wherein said hole is a cylindrical aperture that has its axis aligned transversely to the elongate axis of said screw threaded shaft.

5. The joiner of claim 1, wherein the pivot locator is a projection shaped to nest within a hole within said second gear member.

6. The joining member of claim 2, wherein said engaging member has a recess that accommodates said second gear in a nesting arrangement.

7. The joining member of claim 1, wherein said engaging member has a recess shaped to nest said threadably engagable nut.

8. The joining member of claim 1, wherein said first gear is adapted to engage with said screw threaded shaft.

9. The joiner of claim 1, wherein there are two engaging members such that the screw threaded shaft passes respectively either through an aperture in each respective engaging member or through one or more channels passing through the respective engaging members.

10. The joiner of claim 1, wherein each of the two engaging members have an inner face, an arcuate shape adapted to engage with a nesting fit, a similarly shaped sidewall or cavity within a portion to be joined.

11. The joiner of claim 10, wherein said portion is a desk portion or bench portion.

12. The joiner of claim 9, wherein said engaging members are positively held against said first gear member and said nut with the aid of a support member.

13. The support member of claim 11, wherein said support member is shaped to positively engage said screw threaded shaft.

14. The support member of claim 12, wherein said support member has an inner ridge that engages said screw threaded shaft.

15. The support member of claim 9, wherein said support member is a clip having an inner ridge tat engages said screw threaded shaft.

\* \* \* \* \*